(12) United States Patent
Kim et al.

(10) Patent No.: US 7,909,188 B2
(45) Date of Patent: Mar. 22, 2011

(54) COMPOSITE LINED CLOSURE

(75) Inventors: Sungsuk Steve Kim, Batavia, IL (US); Richard D. Lohrman, North Aurora, IL (US); Charles A Webster, Sugar Road, IL (US)

(73) Assignee: Portola Packaging, Inc., Naperville, IL (US)

( * ) Notice: Subject to any disclaimer, the term of this patent is extended or adjusted under 35 U.S.C. 154(b) by 997 days.

(21) Appl. No.: 10/589,096

(22) PCT Filed: Feb. 9, 2005

(86) PCT No.: PCT/US2005/004213
§ 371 (c)(1),
(2), (4) Date: Apr. 26, 2007

(87) PCT Pub. No.: WO2005/077778
PCT Pub. Date: Aug. 25, 2005

(65) Prior Publication Data
US 2007/0221672 A1 Sep. 27, 2007

Related U.S. Application Data

(60) Provisional application No. 60/543,428, filed on Feb. 9, 2004.

(51) Int. Cl.
*B65D 41/46* (2006.01)

(52) U.S. Cl. ......... 215/320; 220/378; 220/795; 215/317
(58) Field of Classification Search ............. 215/256, 215/341, 354, 317, 320; 220/378, 782, 795
See application file for complete search history.

(56) References Cited

U.S. PATENT DOCUMENTS

| | | | | | |
|---|---|---|---|---|---|
| 3,985,255 | A | * | 10/1976 | Blair | 215/254 |
| 4,512,493 | A | * | 4/1985 | Von Holdt | 220/782 |
| 4,700,860 | A | * | 10/1987 | Li | 215/256 |
| 5,687,865 | A | * | 11/1997 | Adams et al. | 215/253 |
| 5,687,867 | A | * | 11/1997 | Lamoureux | 215/303 |
| 5,909,827 | A | * | 6/1999 | Bietzer et al. | 222/83.5 |
| 5,957,316 | A | * | 9/1999 | Hidding et al. | 215/265 |
| 6,481,589 | B2 | * | 11/2002 | Blomdahl et al. | 215/303 |
| 6,568,563 | B2 | * | 5/2003 | Ma et al. | 222/83 |

* cited by examiner

*Primary Examiner* — Anthony Stashick
*Assistant Examiner* — James N Smalley
(74) *Attorney, Agent, or Firm* — James P. Hanrath; Adam K. Sacharoff

(57) ABSTRACT

A composite lined closure for use with a container having a container neck crown includes a top having a periphery and an underside, a skirt depending downward from the periphery, the skirt including an inner surface and a locking bead radially extending inward from the skirt, and a resilient seal liner extending along the underside and along the inner surface above the sealing bead. Preferably, the liner is formed of an elastomeric material. A method of using the composite lined closure is also described.

14 Claims, 7 Drawing Sheets

COMPOSITE LINED CLOSURE

CROSS-REFERENCES TO RELATED APPLICATIONS

This application is a National Stage of International Patent Application No. PCT/US2005/004213 filed Feb. 9, 2005, which claims the benefit under 35 USC 119(e) to U.S. Provisional Patent Application No. 60/543,428 filed Feb. 9, 2004, the entire contents of which are incorporated herein by this reference.

BACKGROUND OF THE INVENTION

1. Field of the Invention

This invention relates, in general, to composite lined closures and more particularly to closures having a seal liner and methods for their use.

2. Description of Related Art

An exemplar of known caps, which are used with large water containers of the type used with water dispensers and water-coolers is disclosed by U.S. Pat. No. 5,232,125 to Adams. The cap disclosed by the Adams '125 patent includes a tension ring configured to fit under the neck bead, that is the crown of a container neck. The cap disclosed by the Adams '125 patent also includes internal upper and lower seal beads on the inside of the wall of the corner which are configured to engage the container lip and seal against leakage.

The large water containers used with such known caps are generally blow molded and include neck finishes that are trimmed or otherwise finished using conventional methods. Although the neck finishes are somewhat standardized within the container industry, the actual heights of container neck crowns tend to vary to some degree due to the trimming and other finishing processes. In the event that excessive material is removed from a container neck crown during trimming, the upper and lower seal beads of known caps of the type disclosed by the Adams '125 patent might not effectively seal against the crown.

Some known caps for large water containers include a liner to increase the integrity of the seal. One common form of liner comprises a compressible foam liner. Because they are highly compressible, these foam liners are able to accommodate a wide range of bottle dimensions and common bottle finish defects. These plastic foam liners are most often cut as a disk or an annular "donut" from a sheet of material and then inserted or punched into the closure or bottle cap. An exemplar of a cap that has a foam liner is disclosed by U.S. Pat. No. 5,687,865 to Adams et al.

Disadvantageously, the use of a foam liner requires additional assembly steps. For example, the liner is generally inserted into the cap after the cap is formed and prior to the application of the cap to a large water container, thus leading to increased production costs. Also, the only retention mechanism holding the foam liner within the cap is generally an interference fit between the liner and the tension ring of the cap. In this case, a certain amount of liner shifting with respect to the cap can occur for various reasons. For example, the liner might not be inserted perfectly axially with respect to the cap during mechanical cutting and insertion processes. Also, the liner may shift during application of the cap to a container neck.

As the only retention mechanism holding a foam liner in the cap is generally the above-mentioned interference fit, the foam liner may dislodge and fall out from the cap prior to application to a container. In the event that the liner falls out and the cap is applied to the container without the liner, the resulting liquid seal between the cap and the container neck may be severely diminished if not completely compromised.

What is needed is a closure that overcomes the above and other disadvantages of known caps.

BRIEF SUMMARY OF THE INVENTION

One aspect of the present invention is directed to a composite lined closure for use with a container having a container neck crown, the composite lined closure including a top having a periphery and an underside, a skirt depending downward from the periphery, the skirt including an inner surface and a locking bead radially extending inward from the skirt, and a resilient seal liner extending along the underside and along the inner surface above the sealing bead.

In one embodiment, the liner is formed of an elastomeric material. The liner may be injection molded on the inner surface of the skirt. In one embodiment, the cap is injection molded low-density polyethylene and the liner may be injection molded on the inner surface of the skirt. The liner may include an arcuate inner surface.

The arcuate inner surface may be shaped to conform to the crown of a five-gallon water bottle. A lower portion of the arcuate inner surface may extend radially inward allowing the arcuate surface to extend inwardly below the crown of a five-gallon water bottle when the closure is applied to the five-gallon water bottle.

The skirt may include a bottom edge and the closure may further include a tear tab extending downward from the bottom edge and a tear line pair extending from the bottom edge, along the skirt and above the locking bead. The tear lines may begin adjacent the tear tab, extend upwardly and diverge from one another below the locking bead. The tear lines may form a tear strip therebetween, a lower portion of the tear strip being substantially the width of the tear tab while an upper portion of the teat strip is greater than twice the width of the tear tab. The width of the upper portion may be approximately three times the width of the tear tab.

An object of the present invention is to provide a composite lined closure having an improved seal liner.

Yet another object of the present invention is to provide a composite lined closure having an injection molded cap and a seal liner that is injection molded in situ on the cap.

The composite lined closure of the present invention has other features and advantages which will be apparent from or are set forth in more detail in the accompanying drawings, which are incorporated in and form a part of this specification, and the following Detailed Description of the Invention, which together serve to explain the principles of the present invention.

DETAILED DESCRIPTION OF THE INVENTION

Figure 1:
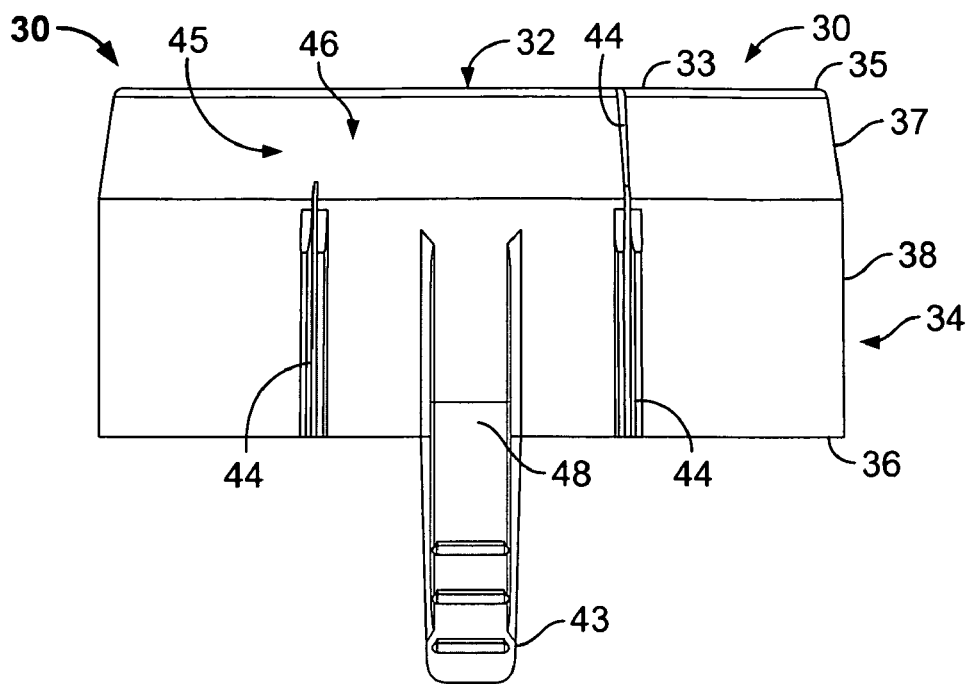
FIG. 1 is an elevational side view of a multiple-material closure in accordance with the present invention.
Figure 2:
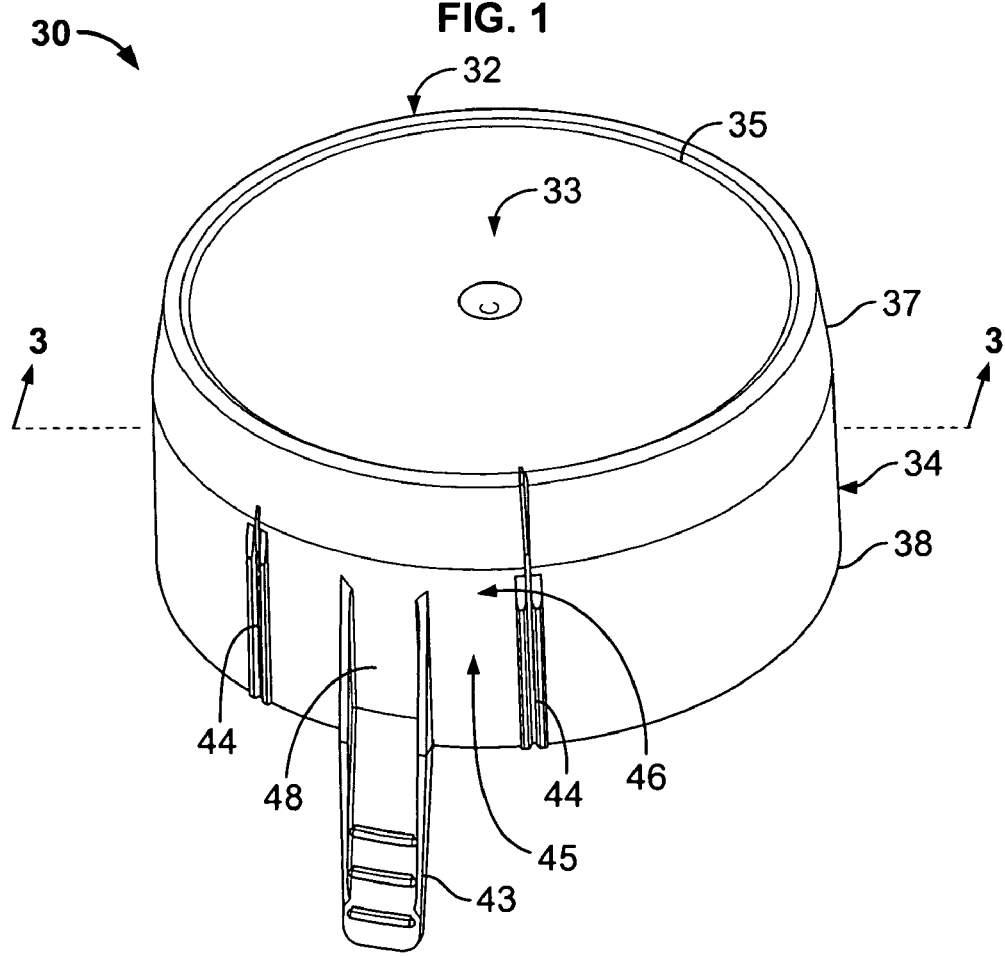
FIG. 2 is a top perspective view of the composite lined closure of FIG. 1.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

Turning now to the drawings, wherein like components are designated by like reference numerals throughout the various figures, attention is directed to FIG. 1 to FIG. 4, which figures illustrate a composite lined closure, generally designated 30, in accordance with the present invention. The multiple-material closure is intended for use with large water containers, for example, three or five-gallon water bottles of the type that are inverted and placed in a water dispenser. It will be understood, however, that the closure of the present invention may be used with containers of other design, for example, smaller diameter closures, snap-on and threaded closures.

In some aspects, the cap is similar to the ones illustrated and described by U.S. Pat. No. 6,681,947 to Kim et al. ("the Kim patent"), U.S. Pat. No. 6,568,563 to Ma et al. ("the Ma patent"), U.S. Pat. No. 6,499,616 to Verderber, U.S. Pat. No. 6,237,790 to Verderber, U.S. Pat. No. 6,177,041 to Bietzer, U.S. Pat. No. 6,102,226 to Verderber, U.S. Pat. No. 5,909,827 to Bietzer et al., U.S. Pat. No. 5,868,281 to Bietzer et al., U.S. Pat. No. 5,687,865 to Adams et al., U.S. Pat. No. 5,662,231 to Adams et al., U.S. Pat. No. 5,513,763 to Adams et al., U.S. Pat. No. 5,370,270 to Adams et al. ("the Adams '270 patent"), and U.S. Pat. No. 5,232,125 to Adams ("the Adams '125 patent"), the entire contents of which patents are incorporated herein by this reference.

Figure 3:
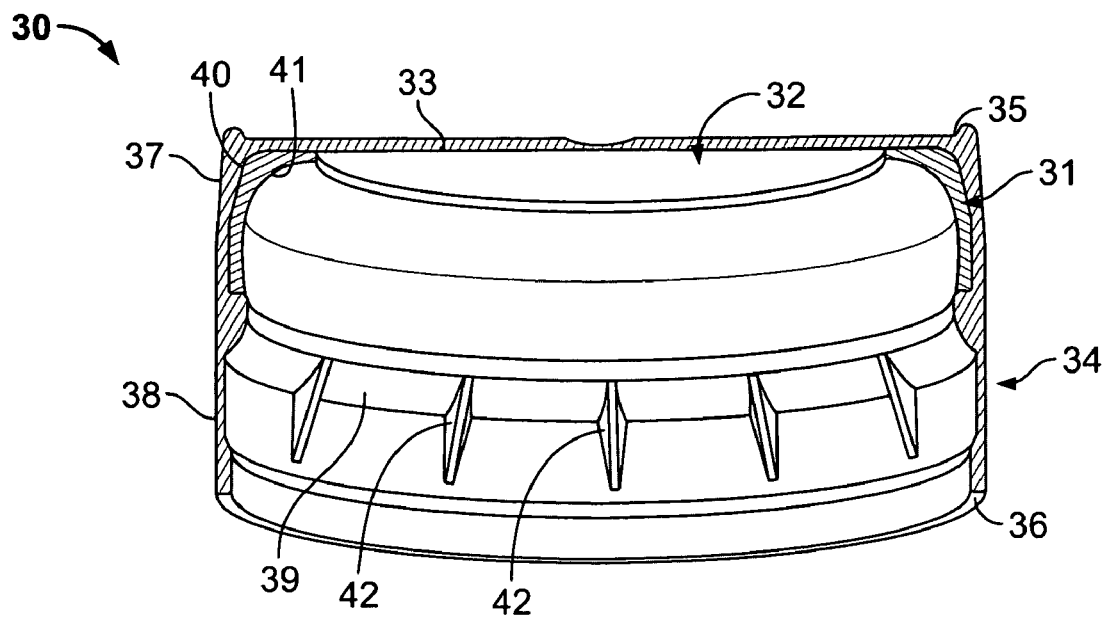
FIG. 3 is a cross-sectional view of the composite lined closure of FIG. 1 taken along line 3-3 of FIG. 2.

Unlike prior caps, however, closure 30 of the present invention includes a resilient seal liner 31 bonded or otherwise mounted to an inner surface of a cap 32, as shown in FIG. 3.

Cap 32 is formed of plastic or other suitable materials. For example, the cap may be formed of polyolefin materials including, but not limited to propylene or ethylene polymers or copolymers, or combinations thereof. Preferably, the cap is formed of a low-density polyethylene (LDPE), however, one should appreciate that other suitable materials can be used including, but not limited to, high-density polyethylene (HDPE) and other olefinic copolymers and mixtures, and flexible vinyl compositions. The material of the cap, together with the generally thin-walled construction of the cap, generally provide for a closure that tightly conforms to the neck crown of the container.

Liner 31 is formed of a material that is more pliable than that which forms cap 32. Preferably, liner 31 is formed of a resilient material having more elasticity than that of the cap which allows the liner to more readily conform to the container crown finish and provide a more effective seal than which cap could alone. For example, the liner may be formed of elastomers, silicones, or urethanes. Preferably, the liner is formed of a thermoplastic elastomer (TPE). One should appreciate that other suitable materials can be used in accordance with the present invention including, but not limited to, olefin-based thermoplastic elastomers. One should appreciate that the liner may also be formed with foaming agents to form a thermoplastic elastomer foam which may further enhance sealing characteristics of the liner.

The liner of the present invention has other advantages over prior caps that lack such a liner. For example, the liner will inhibit removal of the closure from a container neck once it has been applied. The material of the liner, for example, TPE generally has a higher coefficient of friction than the material of the cap. Thus, the liner of the present invention may also serve to prevent rotation of the closure with respect to the container neck, and thus prohibit or prevent someone from twisting the closure off the container neck without damaging the closure. Also, the liner may provide barrier properties that are not present in caps that lack such a liner. For example, the liner may provide a gas barrier which may serve to diminish or eliminate taste and odor issues.

The cap has a top 33 and a skirt 34 that depends from a periphery of the cap. In the illustrated embodiment, the periphery 35 forms a positioning or protecting bead within which a label or other indicia may be applied to the cap. The skirt extends downwardly terminating in a bottom edge 36. In the illustrated embodiment, the skirt includes an angled upper skirt portion 37 and a cylindrical lower skirt portion 38. The angled upper skirt portion may have a frustoconical shape such that it has an inward-upward slant, as shown in FIG. 3. One should appreciate, however, that the upper portion of the skirt need not be angled but may instead be substantially cylindrical.

The cap further includes a locking bead 39 that extends radially from the interior of the skirt. In the illustrated embodiment, the locking bead is located below the intersection of the angled upper portion and the cylindrical lower portion of the skirt. The locking bead fits snugly below the neck crown conventionally formed on the finish of a five-gallon water container. One should appreciate that the location of the locking bead may vary. For example, the locking bead may be located at the intersection of the upper and lower skirt portions.

Liner 31 is positioned above locking bead 39 and includes a contacting surface 40 which substantially conforms the interior surface of upper portion 37 of the skirt above the locking bead. The liner further includes an inner surface 41 that is shaped to substantially conform to the profile of a container neck crown. For example, in the embodiment of FIG. 3, the liner includes an arcuately-shaped inner surface that closely approximates the radius of curvature of the container-neck crown of a standard five-gallon water bottle, which crown generally has an outer diameter of approximately 2⅛ inches and a radius of curvature of approximately ⅛ to ¼ inches. The liner is dimensioned to provide an interference fit with the container-neck crown of a standard five-gallon water bottle and inner surface 41 preferably has an outer diameter less than 2⅛ inches.

The resilience of the liner provides for an annular seal that readily accommodates imperfections in the finish of the container-neck crown and thus provides a closure having an improved seal. In one embodiment, as shown in FIG. 3, locking bead 39 extends radially inward further than the lower edge of liner 31. One will appreciate that the locking bead primarily functions to retain the closure on the container neck while the illustrated liner primarily functions to provide a substantially watertight seal between the container-neck crown and the cap. One should appreciate, however, that the liner may both be configured to secure and to seal the cap to the container. In this case, the liner may be dimensioned to include a locking bead thereon.

The material of the liner may have a higher coefficient of friction than the material of the closure. In such instances, the contacting surface of the liner, which contacts the crown surface of the container neck, may serve to impede rotational and/or axial motion of the closure with respect to the container neck further preventing unintended removal of the closure from the container neck.

The thin-walled configuration allows the cap to substantially conform to the crown of a container neck as the closure is applied to the container neck. This ability of upper skirt portion to conform to the neck crown also increases the performance of the seal liner. In particular, as the upper skirt portion conforms to the shape of the neck crown, the contact pressure between the surface area of the liner and the neck crown increases significantly. Also, the liner of the present invention provides for a closure having an improved radial seal, that is, an improved seal against the sides of the container neck.

In one embodiment shown in FIG. 3, the cap includes circumferentially spaced gussets 42 that extend at an angle from cylindrical lower portion 38 of skirt 34 upwardly into an adjacent bottom portion of locking bead 39. Such gussets not only provide structural integrity to the locking bead but also assist in applying the closure to the container neck. In particular, the gussets also serve as a ramp against the container neck crown thus facilitating the locking bead and the liner in passing over the container neck crown upon application of closure 30 to the container neck.

The illustrated gussets are substantially triangular-shaped flat members extending from the cylindrical lower portion of the skirt into the locking bead. One should appreciate that the gussets may have a variety of shapes, and other types of reinforcing structure can be used. For example, the gussets may have an arcuate shape that sweeps from the lower portion of the skirt into the locking bead.

The cap includes a tear tab 43 that extends downwardly from the bottom edge 36 of the skirt. A pair of spaced lines of weakness or tear lines 44 extend upwardly along the skirt to form a tear strip 45 therebetween. In the illustrated embodiment, the tear lines extend from the bottom edge, along the outer surface of skirt 34, and terminate approximately at the top of the skirt adjacent periphery 35 of the top. One will appreciate, however, that other tear line configurations may be used. For example, the tear lines may terminate between the locking bead and the top and/or extend onto the top. The tear lines may be formed on the exterior surface and/or the interior surface of the skirt.

In the illustrated embodiment of FIG. 1 and unlike most prior caps, a portion of the tear lines are spaced from one another approximately ¾ to 1¼ inches as the tear lines pass over locking bead 39 and liner 31 thus forming a wide portion 46 of tear strip 45 that is approximately 2½ to 3½ times, and preferably about 3 times wider, than the tear tab of other five-gallon closures such as those shown in, for example, the above-mentioned Kim and Ma patents. The spaced configuration of the tear lines provides a wide tear strip that facilitates tear propagation along the tear lines through the locking bead and the liner. The spaced or wide configuration of the tear strip also ensures that an adequate portion of the locking bead and the liner is removed from underneath the crown of the container neck when tear strip 45 is torn away from the skirt and thus facilitates removal of the cap as a user pulls the tear strip away from the container neck.

Figure 4:
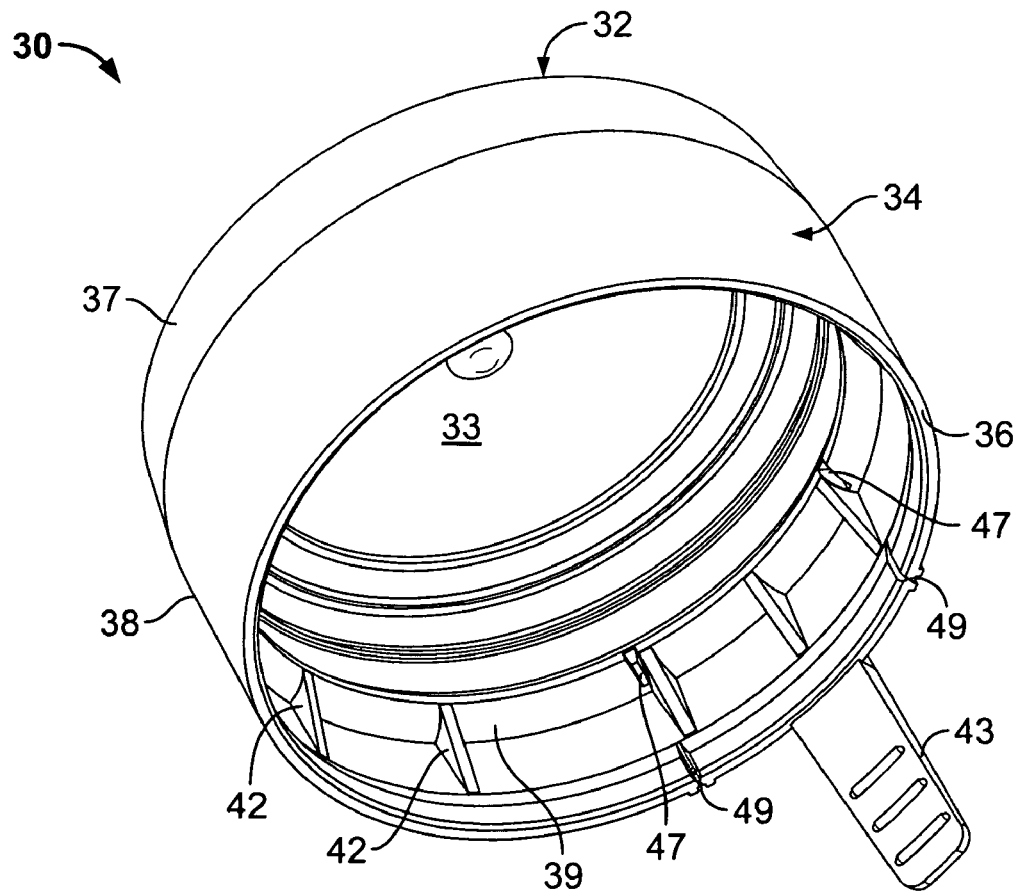
FIG. 4 is a bottom perspective view of the composite lined closure of FIG. 1.

The tear lines may be provided with bead notches 47, as shown in FIG. 4, to further assist tearing through the locking bead. One should appreciate that the depth and dimensions of the bead notches may vary in accordance with the present invention. Since the liner coats the upper portion of the locking bead, the notches may extend completely through the locking bead as the locking bead does not serve to provide a seal between the closure and the container neck.

In the illustrated embodiment, a lower portion of tear lines 44 extend from bottom edge 36 immediately adjacent tear tab 43 forming a narrow portion 48 that allowing a user to readily initiate tearing along the tear lines. The bottom edge of the skirt may be provided with tear-tab notches 49 to further facilitate tear initiation. The tear lines diverge outwardly along the skirt along respective diverging portions below the locking bead so as to form wide portion 46 of tear strip 45, which wide portion facilitates a user in removing closure 30 from the container neck. For example, wide portion 46 provides a user with significant gripping and leverage allowing the user to tear through locking bead 39 and liner 31.

One should appreciate that a wide tear strip does not require diverging tear lines or an excessively wide tear tab. Instead, the tear lines may extend straight down the skirt and form a wide tear strip extending down the length of the skirt to the bottom edge and spaced away from a "standard-width" tear tab (e.g., having a width of approximately ¼ inch). The diverging configuration, however, has certain advantages. For example, the diverging design allows for the use of a conventional width tear tab and thus requires less material than a "wide" tear tab. One should appreciate that a standard-width tear tab not only requires less material, but is also compatible with existing capping equipment.

One method of forming closure 30, in accordance with the present invention, can now be described. Cap 32 may be injection molded in a conventional manner, that is, by injecting a first molten plastic material into a mold shaped to form the cap. One will appreciate that the cap-forming cavity of the molding apparatus will form the exterior surfaces of the cap while a cap-forming core of the molding apparatus will form the interior surfaces of the cap. For example, locking bead 39 and gussets 42 may be formed by the cap-forming core.

Once cap 32 is formed, a second molten elastomeric material may be injected to form the liner. As the liner is molded in situ on the cap above the locking bead, the exterior surface of liner 31 will conform to the interior surface of cap 32 above locking bead 39.

In one embodiment, the contacting surface 41 of the liner is bonded directly to the inner surface of upper skirt portion 37 of the cap. In this case, the liner material is injected at a temperature and under conditions sufficient to bond or weld the liner material directly to the cap material. If necessary, the temperature of the cap may elevated to facilitate bonding or fusing of the liner and cap materials.

Advantageously, closures formed by the above-described two-shot molding operation are provided with liners that may be permanently bonded to the cap. Such a bonded-liner configuration may provide a closure that facilitates removal of the closure from a container-neck crown. For example, as a consumer tears along the tear lines to remove the closure, tearing along the tear lines may readily propagate through the liner as the liner is bonded directly to the cap skirt. Alternatively, materials may be chosen to allow for a variety of adhesion characteristics that would allow a designer to alter the adhesive relationship between the liner and the cap.

One will appreciate, however, that other methods may be used to form the closure in accordance with the present invention. For example, the closure may be formed with bi-injection molding, two-shot molding, insert molding, multi-injection molding, over-molding, and/or other molding processes.

In operation and use, when closure 30 is applied to a container neck, the closure seats on the container-neck crown and cannot be removed from the container so long as locking bead 39 remains intact. To open the container, a consumer grips tear tab 43. The user then pulls the tear tab upwardly and/or outwardly and thus causes tearing along tear lines 44. With continued pulling, the consumer tears through the locking bead thus releasing the closure from the crown of the container neck. The consumer may then completely remove the closure from the container neck and access the contents of the container.

As the locking bead is substantially destroyed upon removal thereof by a consumer, thus the closure may only be used once. This configuration is advantageous when used in combination with returnable bottles because such configuration prevents misuse of the returnable bottle. For example, since the locking bead is inoperable once a user tears the tear tab portion through the locking bead, a user cannot reuse the cap to reseal the container. Advantageously, this configuration discourages misuse of returnable bottles and, in particular, discourages the reuse of returnable bottles to store possibly harmful and dangerous substances.

Many features of the present invention provide for a closure that is lightweight. For example, the gussets allow for thinner walls of the skirt and top. The lighter weight advantageously results in less distortion of caps located in the bottom of shipping boxes due to settling during shipping and handling. Furthermore, the lightweight design provides for a less-expensive and environment-friendly cap because less material is used to manufacture the cap.

Advantageously, the structural walls of the cap of the present invention are more uniform in design, a feature that reduces environmental stress cracking. Since the closures used to seal large water bottles generally are always under stress when seated on a container neck of a bottle. Environmental stress cracking may be caused by great variations in thickness of a low-density polyethylene closure under stress. Such environmental stress cracking often results from excessive wall thickness. The closure of the present invention is of a thin-walled design that avoids excessive wall thicknesses found in prior caps. Accordingly, the thin-walled design of the closure of the present invention minimizes and/or prevents environmental stress cracking commonly found in prior caps.

Figure 5:
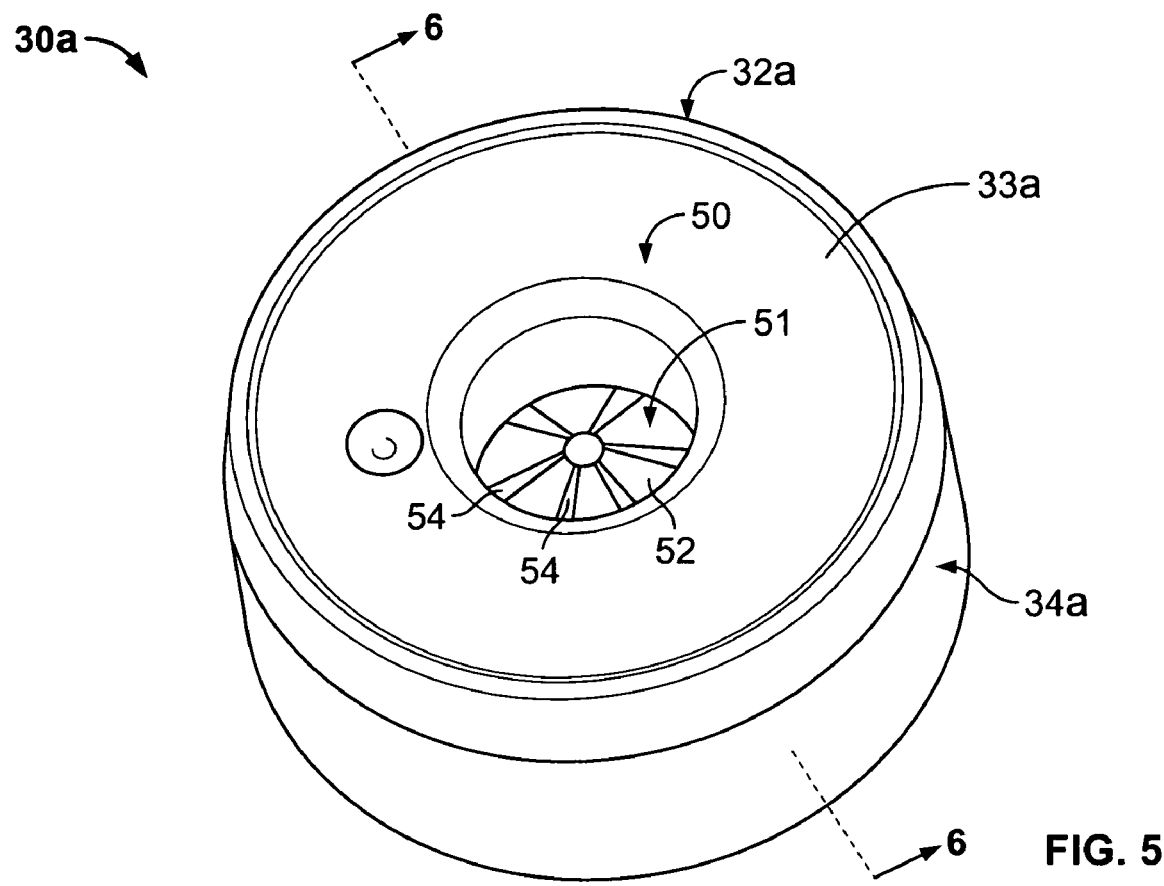
FIG. 5 is an elevational side view of another composite lined closure in accordance with the present invention.

In one embodiment of the present invention shown in FIG. 5, composite lined closure 30a is configured as a "non-spill" closure. Like reference numerals have been used to describe like components of closure 30 and closure 30a. In many respects, the structure of the closure 30a resembles that of closure 30 discussed above but includes a central non-spill well 50 that is dimensioned and configured to receive the probe of a water dispenser in a manner similar in some aspects to that which is disclosed by the above-mentioned Adams '270 patent.

In this embodiment, the well has an inverse conical design in which an inverted cone 51 forms the bottom of well 50. The inverted cone includes a membrane 52 that closes the well. The membrane may be monolithically formed with liner 31a. In the event that the liner is injection molded, one or more liner legs 53 may be provided to allow material to run from liner 31a to membrane 52 during the molding process. The illustrated embodiment includes six legs, however, one, two, three or more legs may be provided to facilitate transporting liner material to the membrane. As the material of the membrane is the same as that of the liner, membrane 52 is readily torn by the probe of a water dispenser as a water container sealed by closure 30a is inverted and installed on a water dispenser.

The inverted cone also includes a series of radially extending fingers 54 that extend from a lower edge of the well and along or through membrane 52. The fingers may be monolithically formed with cap 32a. As the material of the fingers is the same as that of the cap, the fingers provide structural integrity to the bottom of the well. In the illustrated embodiment, the inverted cone includes six fingers, however, one should appreciate that one, two, three or more fingers may be provided, extending partially or completely across the bottom of the well. One should also appreciate that fingers need not be provided in the event that the membrane has sufficient structural integrity to maintain an effective seal.

Although the inverted cone configuration may be particularly useful in facilitating contact with a water dispenser probe, one should appreciate that the membrane and fingers need not form an inverted cone. Instead, other well configurations may be used including, but not limited to, wells having a downwardly extending cone and/or wells having a substantially disk-shaped bottom.

In operation and distribution, closure 30a is formed and used in substantially the same manner as closure 30 discussed above. In the illustrated embodiment, closure 30a is not provided with a tear tab and is instead intended to be removed by conventional decapping equipment in a well-known manner associated with non-spill closures. One will appreciate, however, that closure 30a may be provided with a tear tab.

Figure 8:
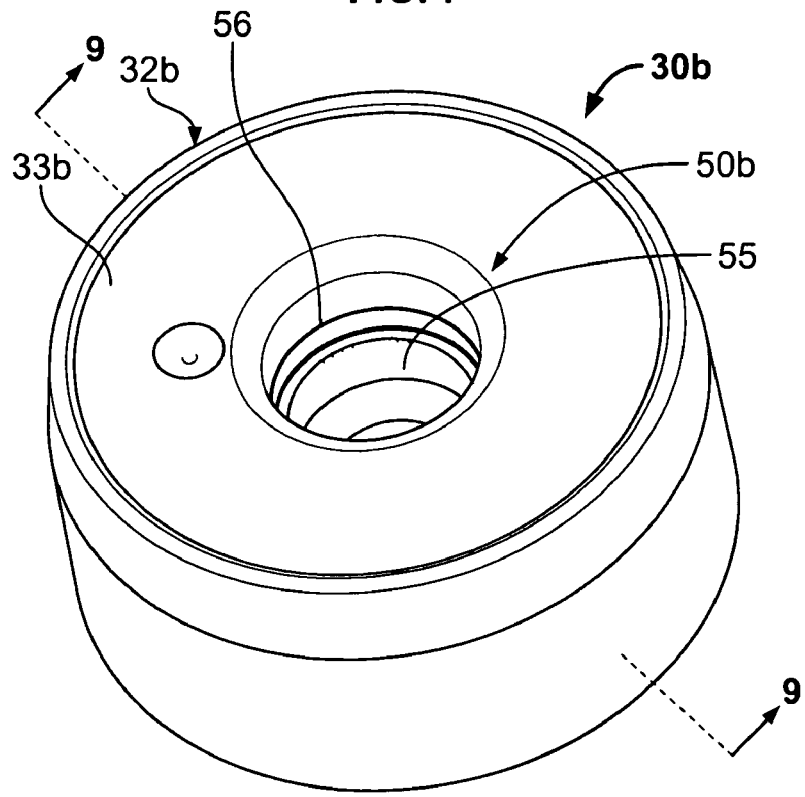
FIG. 8 is a top perspective view of another composite lined closure in accordance with the present invention.

In one embodiment shown in FIG. 8, composite lined closure 30b is also configured as a "non-spill" closure in accordance with the present invention. In many respects, the structure of the closure 30b resembles that of closures 30 and 30a discussed above but includes a non-spill well 50b having an integrally formed plug 55. The plug is dimensioned and configured to receive the probe of a water dispenser in a manner similar to that which is disclosed by the above-mentioned Adams '270 patent.

Figure 9:
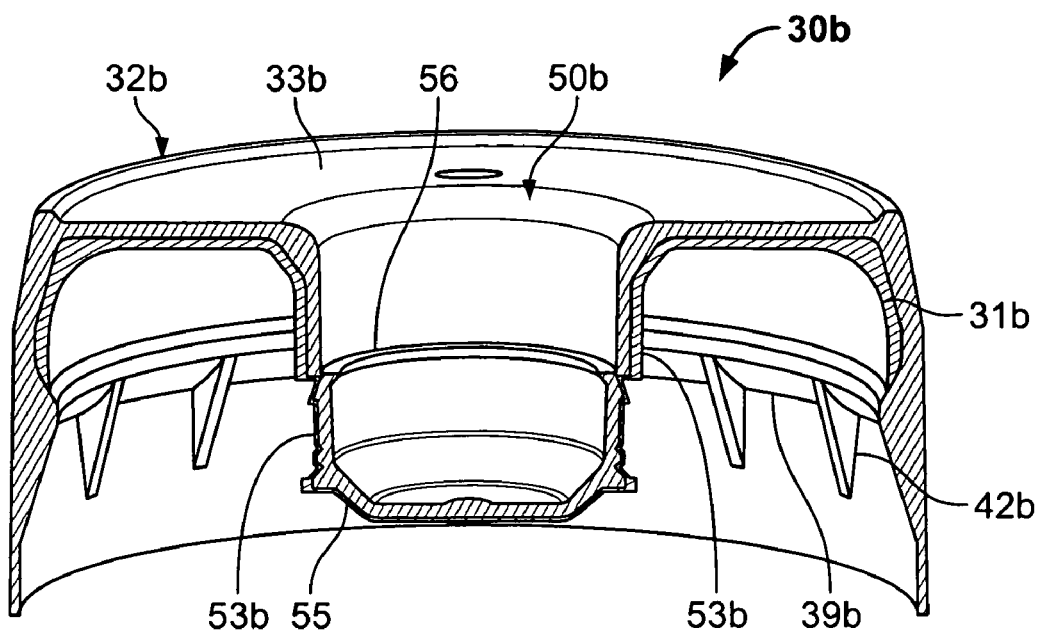
FIG. 9 is a cross-sectional view of the composite lined closure of FIG. 8 taken along line 9-9 of FIG. 8.

In this embodiment, the body of plug 55 is monolithically formed with cap 32b. The plug may be joined to the bottom edge of well 50 by a line of weakness 56. The line of weakness may be formed by the same material as liner 31, as illustrated in FIG. 9. In this case, the closure is also provided with one or more legs 53b in order to provide a path for material to move from liner 31b to the line of weakness 56 during an injection molding process. As the material of the line of weakness is the same as that of the liner, line of weakness 56 is readily torn by the probe of a water dispenser as a water container bearing closure 30b is inverted and installed on the water dispenser.

Advantageously, the breakaway plug configuration of closure 30b allows use with non-spill water dispenser probe of the type disclosed in the Adams '270 patent.

In operation and distribution, closure 30b is formed and used in substantially the same manner as closures 30 and 30a discussed above. In the illustrated embodiment, closure 30b is not provided with a tear tab and is, instead intended to be removed by conventional decapping equipment in a well-known manner associated with non-spill closures. One will appreciate, however, that closure 30b may be provided with a tear tab.

Figure 11:
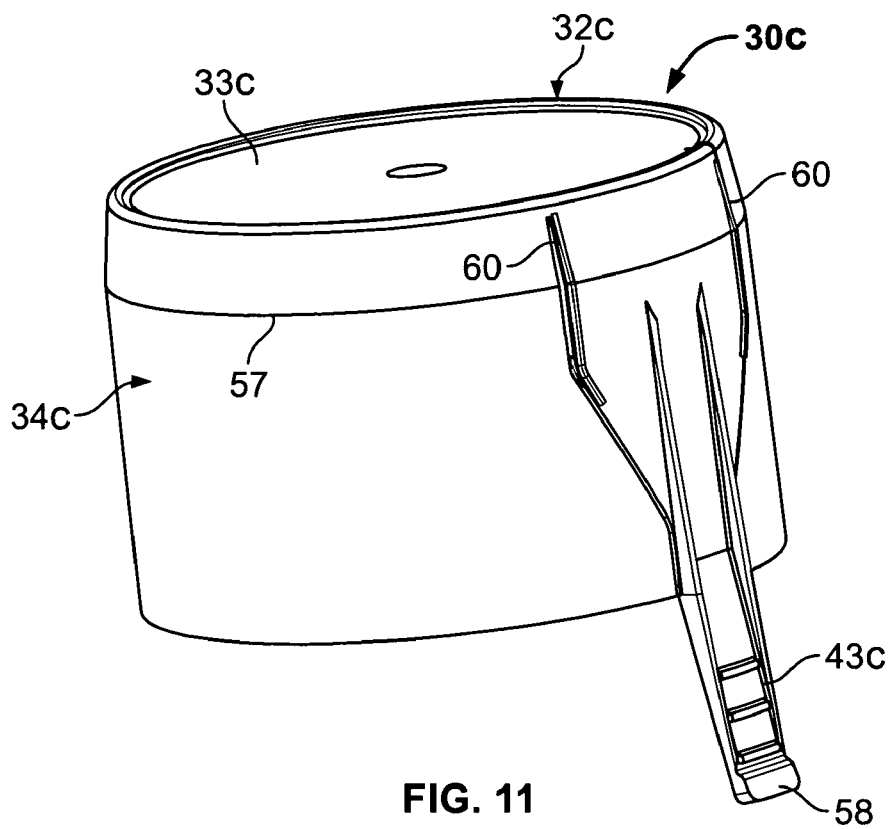
FIG. 11 is an upper perspective view of another composite lined closure in accordance with the present invention.

In one embodiment of the present invention shown in FIG. 11, composite lined closure 30c is similar to that shown in FIG. 1. Like reference numerals have been used to describe like components of closures 30, 30a, 30b and 30c. In many respects, the structure of cap 32c resembles that of cap 32 discussed above but includes an external tear line that is similar in some aspects to the tear lines disclosed by the Adams '125 and the Adams '270 patents. Although cap 32c is illustrated without the corresponding liner, closure 30c preferably includes a liner (not shown) similar to liner 31 described above, which liner may be formed in similar manner as liner 31 described above.

In this embodiment, the cap has a single external tear line 44c which extends upwardly from tear tab 43c to a horizontally extending portion 57. In this embodiment, tear tab 43c includes a gripping lug 58 that extends outwardly from the lower extent of the tear tab. One will appreciate that the tear tab may be provided with other suitable gripping means such as external ribbing or protrusions to facilitate a user in gripping and pulling the tear tab to initiate tearing along the tear line and removing the closure from a container neck.

Figure 13:
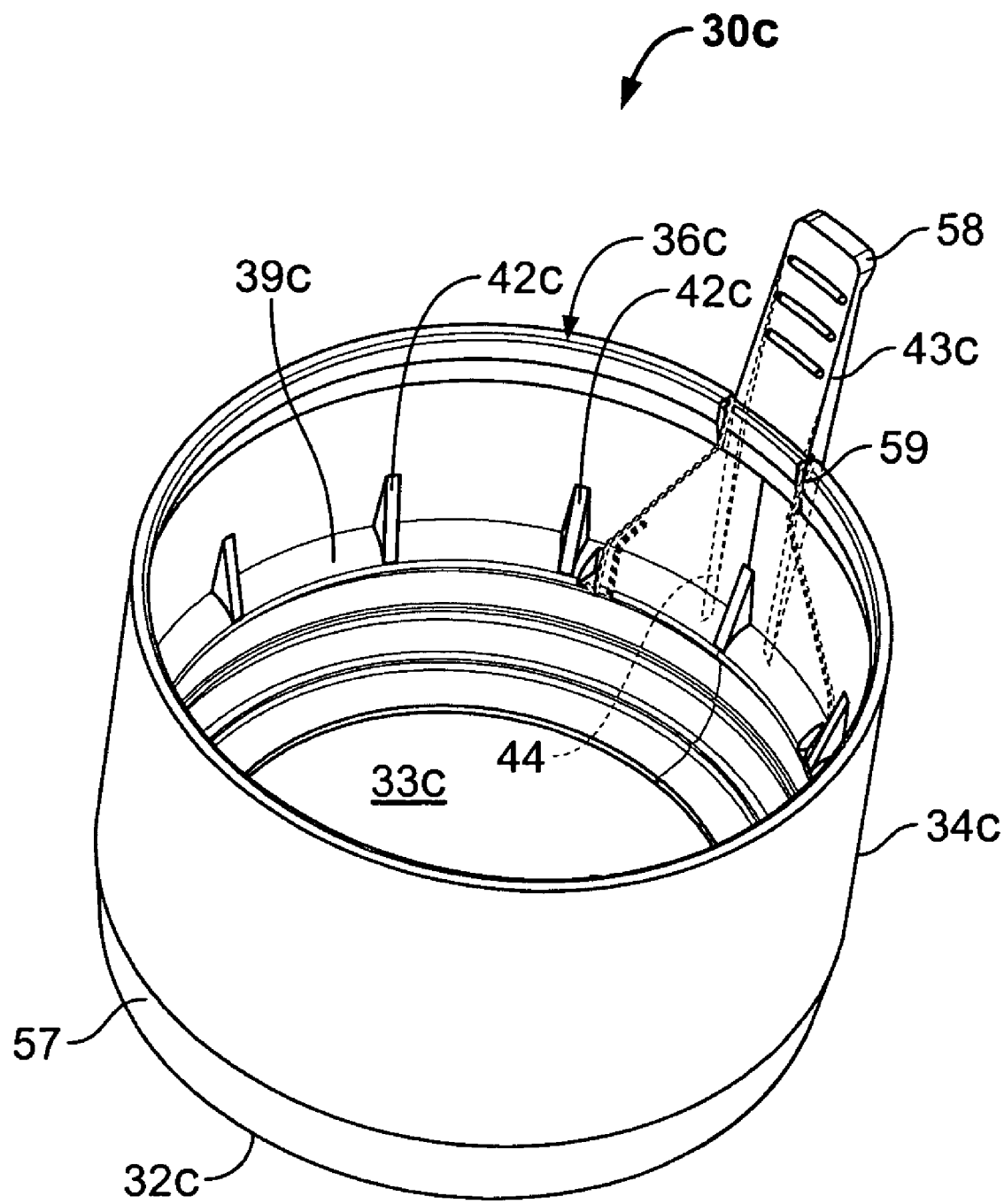
FIG. 13 is a bottom perspective view of the composite lined closure of FIG. 11, similar to FIG. 12 but showing further details of an external tear line in phantom.

In this embodiment, the tear line gently curves and extends past locking bead 39c while horizontal portion 57 of the tear line extends along and/or slightly above the upper extent of locking bead 39c, as shown in FIG. 13. In the illustrated embodiment, the horizontal portion extends approximately halfway around the cap, however, one will appreciate that the horizontal portion need only extend a sufficient amount around the closure to sufficiently disengage the locking bead of the cap from the container neck to allow removal of the closure from the neck. The tear line may extend between approximately 90° and 270° from the tear tab, and preferably extends approximately 180°.

In the illustrated embodiment, the curved tear line is an external tear line which may be formed by complementarily-shaped standing steel in the mold cavity used to form the cap. A split mold cavity may be used to form the cap, in which case, the parting line of the mold is aligned with the vertical portion of the tear line adjacent to the tear tab. One will appreciate that an internal tear line may also be used, in which case the tear line may be formed by complementarily-shaped standing steel on the mold core. Further still, the tear line may be composed of a combination of internal and external tear line segments that cooperate to form a substantially continuous tear line extending from the tear tab to the horizontally extending portion of the tear line.

With continued reference to FIG. 13, the tear line is also provided with an internal bottom edge notch 59 to facilitate tearing through the thickened bottom edge portion of skirt 34c. One will appreciate that tear line may be provided with an external bottom edge notch in addition to, or instead of, the internal bottom edge notch.

With reference to FIG. 11, cap 32c may be provided with circumferentially-spaced external protrusions 60 which are located above the horizontal portion of the tear line. As the liner is made of a resilient material that tightly conforms to the container neck, a higher application force may be necessary to apply the closure to a container neck. External protrusions 60 provide an external shoulder against which application force may be applied downwardly supplemental to, or instead of, the application force that is typically applied to top 33c in order to seat the closure on a container neck. The external protrusions may also provide an external shoulder that may facilitate handling of the closure, both before and after the closure has been applied to a container neck.

In operation and distribution, closure 30c is formed and used in substantially the same manner as the closures discussed above.

For convenience in explanation and accurate definition in the appended claims, the terms "up" or "upper", "down" or "lower", "inner" and "outer", "inside" and "outside" are used to describe features of the present invention with reference to the positions of such features as displayed in the figures.

Figure 6:
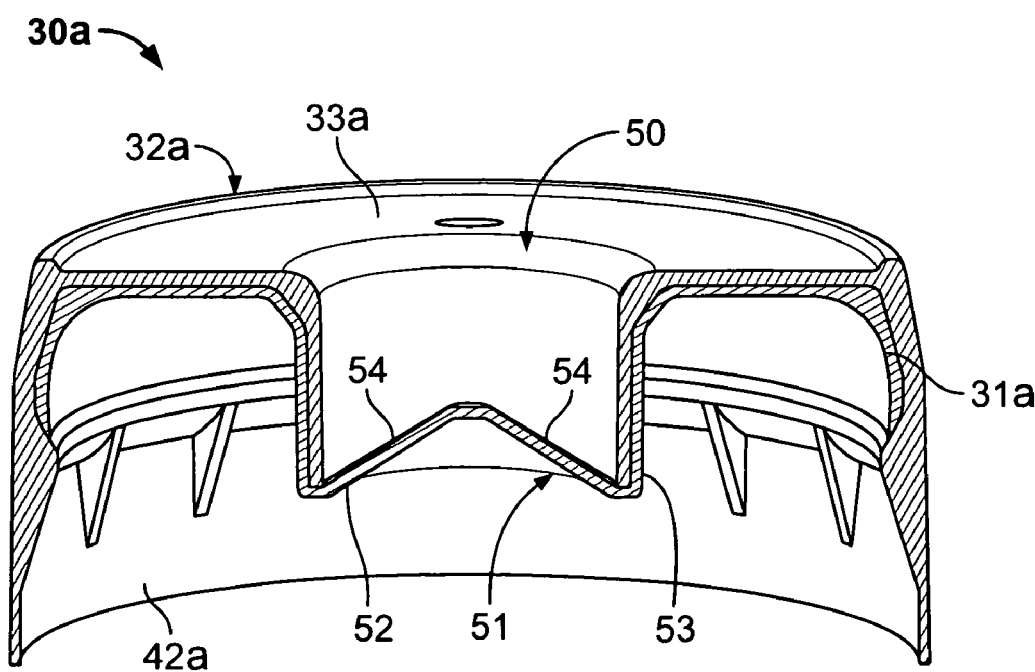
FIG. 6 is a cross-sectional view of the composite lined closure of FIG. 5 taken along line 6-6 of FIG. 5.
Figure 7:
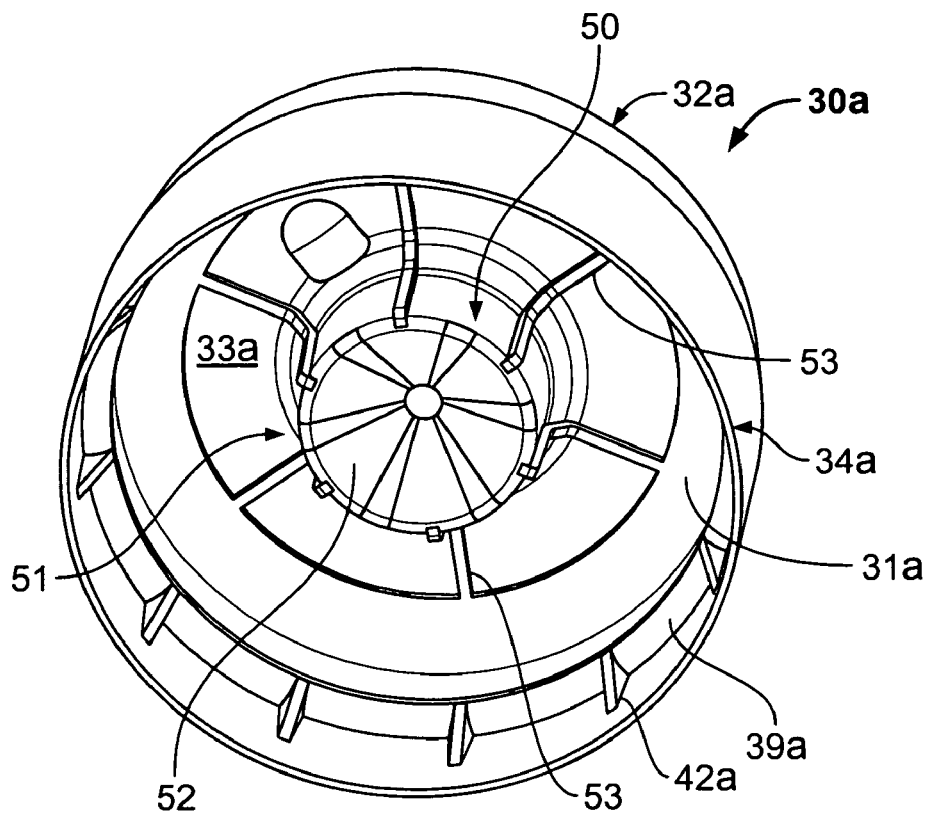
FIG. 7 is a bottom perspective view of the composite lined closure of FIG. 5.
Figure 10:
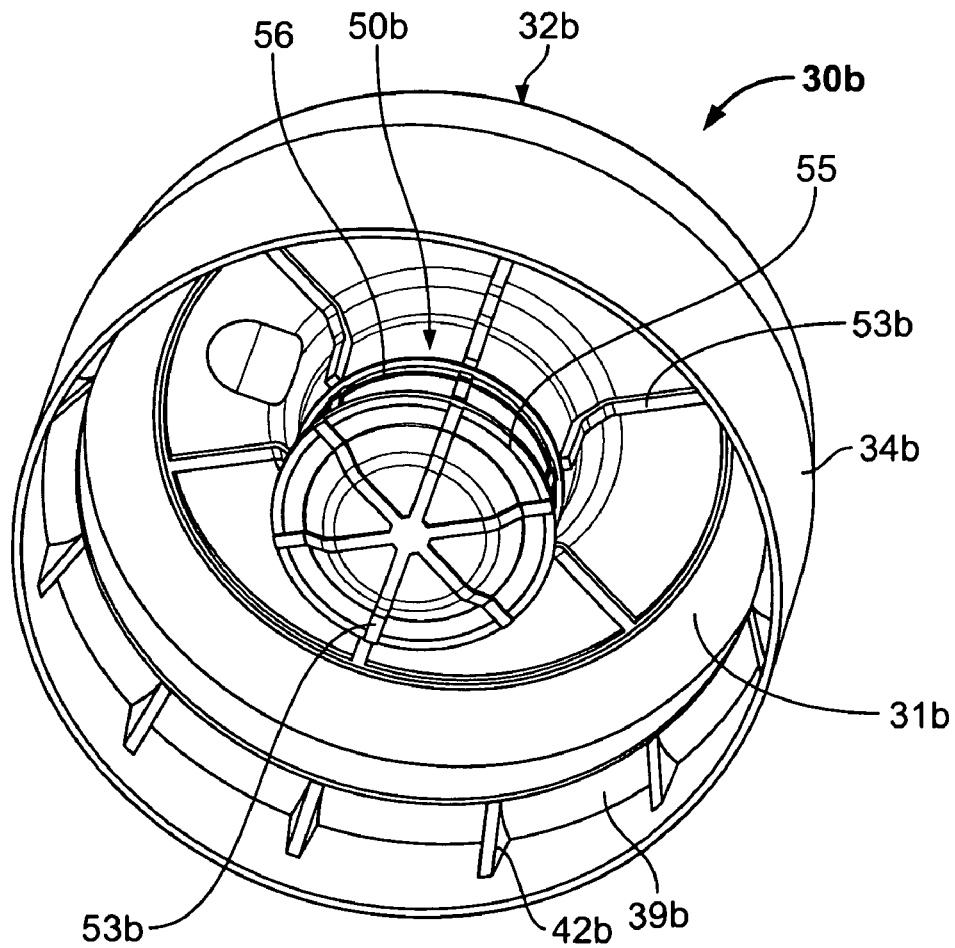
FIG. 10 is a bottom perspective view of the composite lined closure of FIG. 8.
Figure 12:
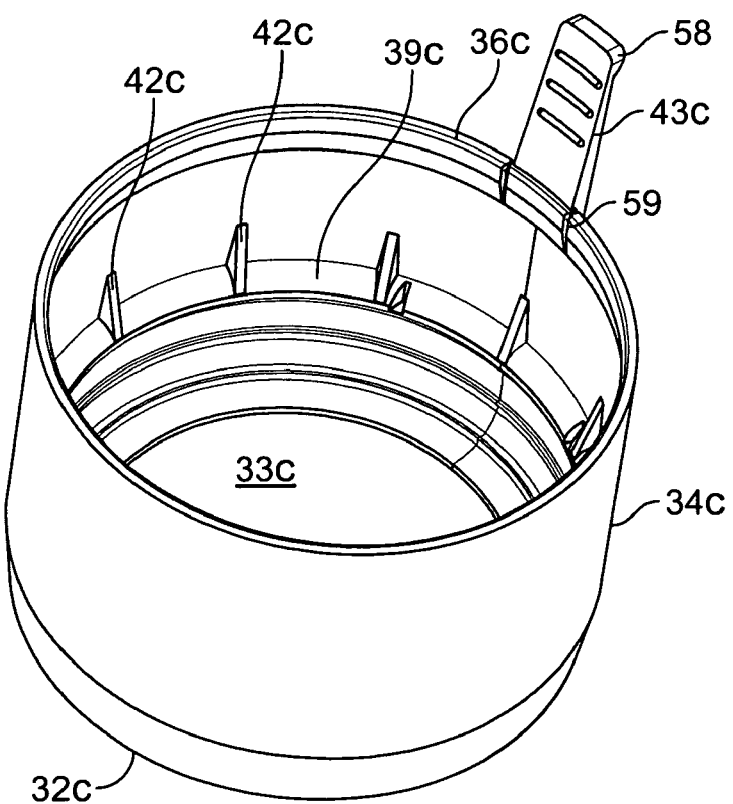
FIG. 12 is a bottom perspective view of the composite lined closure of FIG. 11.

In many respects the modifications of the various figures resemble those of preceding modifications and the same reference numerals followed by subscripts "a", "b" and "c" designate corresponding parts. For example, in addition to other subscript corresponding parts heretofore discussed, cap top 33a and cap skirt 34a of FIGS. 5, 6, and 7, skirt bottom edge 36c of FIG. 12, locking bead 39b of FIGS. 9 and 10, gussets 42a of FIG. 7, 42b of FIGS. 9 and 10, and 42c of FIGS. 12 and 13 all are like components designated by like reference numerals of various earlier figures.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A composite lined closure for use with a container having a container neck crown, said composite lined closure comprising:
    a top having a periphery, an underside, a central well, and a surface closing said well;
    a skirt depending downward from said periphery, said skirt including an inner surface and a locking bead radially extending inward from said skirt; and
    a resilient seal liner extending along said underside, down said inner surface and to said locking bead, said liner having an arcuate inner surface, a lower portion of said arcuate inner surface disposed radially inward below said container neck crown when said closure is applied to said container;
    wherein said surface closing said well is a membrane monolithically formed with said liner and wherein one or more liner legs are provided to allow material forming the liner to run from the liner to the membrane during the molding process.

2. A closure according to claim 1, wherein said liner is formed of an elastomeric material.

3. A closure according to claim 2, wherein said liner is injection molded on said inner surface of said skirt.

4. A closure according to claim 2, wherein said closure is injection molded low-density polyethylene.

5. A closure according to claim 4, wherein said liner is injection molded on said inner surface of said skirt.

6. A closure according to claim 1, wherein said arcuate inner surface is shaped to conform with the crown of a five-gallon water bottle.

7. A closure according to claim 1, wherein said skirt further includes a plurality of gussets that extend at an angle from a lower portion of said skirt upwardly into an adjacent bottom portion of said locking bead.

8. A closure according to claim 1, wherein said skirt includes a bottom edge, said closure further comprising a tear tab extending downward from said bottom edge and a pair of tear lines extending from said bottom edge, along said skirt and above said locking bead.

9. A closure according to claim 8, wherein said tear lines begin adjacent said tear tab, extend upwardly and diverge from one another below said locking bead.

10. A closure according to claim 9, wherein said tear lines form a tear strip therebetween, a lower portion of said tear strip being substantially the width of said tear tab while an upper portion of said tear strip is greater than twice the width of said tear tab.

11. A closure according to claim 10, wherein the width of said upper portion is approximately three times the width of said tear tab.

12. A closure according to claim 1, wherein said liner is formed of a thermoplastic elastomer.

13. A closure according to claim 1, wherein said membrane forms an inverted cone.

14. A closure according to claim 13, wherein said inverted cone includes one or more radially extending fingers extending from a lower edge of the well and along or through said membrane.

* * * * *